April 17, 1945.　　F. E. WOLCOTT ET AL　　2,373,987
FILTER FRAME
Filed April 21, 1941
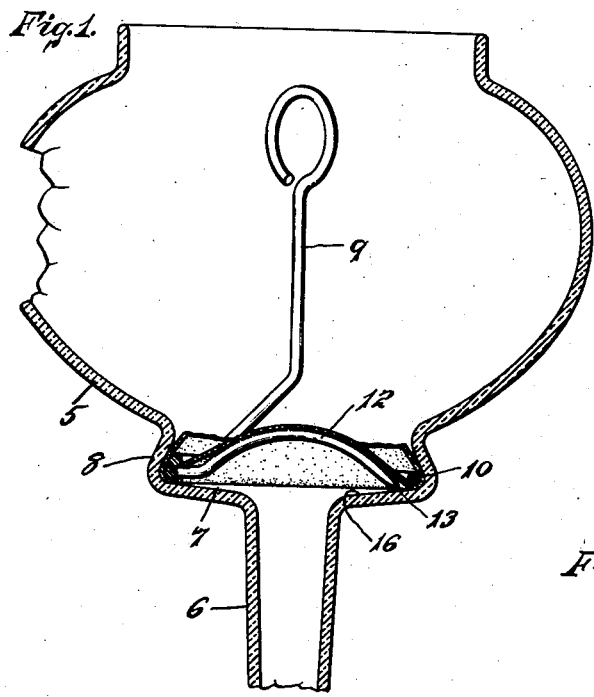
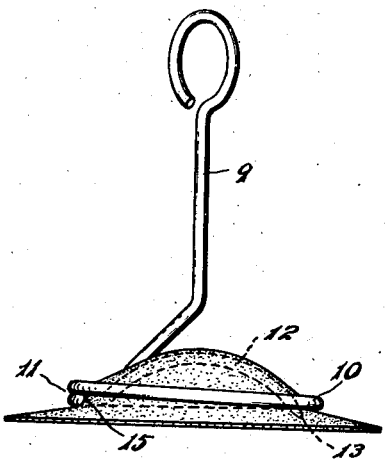
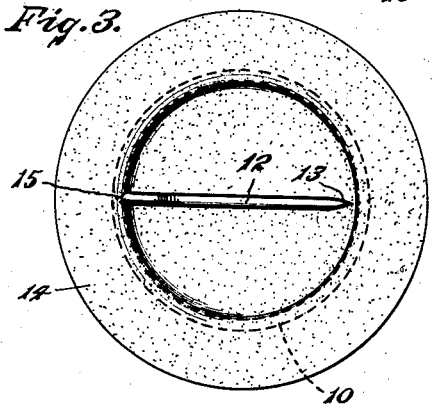
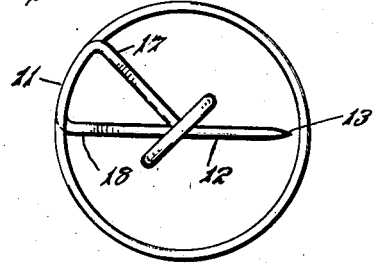
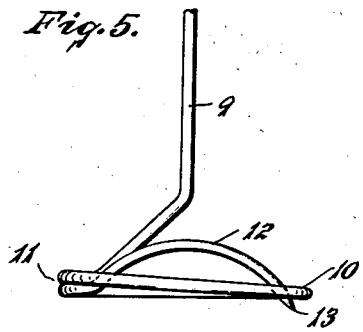
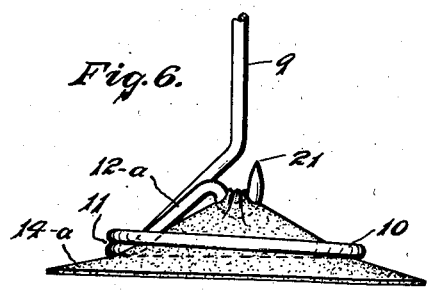
INVENTORS.
FRANK E. WOLCOTT.
LOUIS V. LUCIA.
BY
ATTORNEY.

Patented Apr. 17, 1945

2,373,987

UNITED STATES PATENT OFFICE 2,373,987

FILTER FRAME

Frank E. Wolcott and Louis V. Lucia, West Hartford, Conn., assignors to The Silex Company, Hartford, Conn., a corporation of Connecticut Application April 21, 1941, Serial No. 389,482

14 Claims. (Cl. 210—162)

This invention relates to improvements in filtering devices and more particularly to such devices as are used in the upper bowls of vacuum type coffee makers for filtering the brew from an upper bowl into a lower bowl.

Filtering devices of this class, such as heretofore produced, have commonly consisted of a frame requiring a filtering member, or cloth, which must be especially constructed in order to fit the said frame and be retained thereon. Furthermore, these filters have been expensive to produce and have made it necessary that a supply of them be kept available so that the coffee maker could be used when needed.

It is also commonly known that, in such filtering devices, it is very important that the filtering cloth be supported in a spaced position from the bottom of the bowl and in such a manner that the pressure of the brew will not cause it to rest against the said bottom and thereby prevent efficient filtration through the cloth.

The object of the present invention, therefore, is to provide a filtering device, particularly for vacuum type coffee makers, with which any ordinary piece of cloth material, which is available, may be used as a filter without requiring any special work thereon or that it be of any particular size or shape.

A further object of the invention is to provide such a filtering device consisting of a frame which is easy to use, inexpensive to produce and highly efficient in its operation.

A still further object is to provide such a filtering device having a frame with means for supporting a filter cloth well above the bottom of the coffee maker bowl, to thereby assure free filtration therethrough and maximum efficiency so that the passing of the brew from the upper to the lower bowl of the coffee maker is accomplished in a minimum amount of time; this being also highly desirable in coffee makers of the vacuum type.

Further objects of this invention will be more clearly understood from the following description and from the accompanying drawing in which:

Fig. 1 is a side view of our improved filtering device, in central vertical section, and as used in an upper bowl for vacuum type coffee makers.

Fig. 2 is a side view in elevation of said filtering device and showing a filtering cloth attached thereto.

Fig. 3 is a bottom view of the same.

Fig. 4 is a plan view of the frame of said filtering device.

Fig. 5 is a side view thereof in elevation.

Fig. 6 is a side view in elevation of a modified form of a filtering device embodying the present invention.

As illustrated in the drawing, the numeral 5 denotes an upper bowl of a vacuum type coffee maker which has a stem 6 that is adapted to extend into a lower bowl of said coffee maker in a well known manner.

Such upper bowls may include a well 7 in the bottom thereof having downwardly diverging walls 8 which surround the opening in the stem 6.

Our improved filtering device preferably consists of a frame having a handle portion 9 which extends upwardly from an annular portion 10 that is preferably in the nature of a wire spring having a single coil that overlaps for a portion thereof, as at 11, to eliminate a break in the periphery of the said annular portion.

A projection 12 extends from one end of the wire forming said frame and crosswise to the portion 10. The said bar is arched and is provided with a piercing point 13 for the purpose to be hereinafter described.

A filter cloth 14, of any suitable filtering material and in the form of a disc or other shape, may be mounted on said frame by simply forcing the point 13 of the projection 12 through the said cloth, as indicated at 15, whereupon the upper portion of the cloth is carried over the arch in the bar 12 and retained on said frame substantially in the position illustrated in Fig. 2, wherein it is spaced from the bottom 16.

The said filtering device may then be lowered into the upper bowl and forced into the recess 7, to the position clearly illustrated in Fig. 1, wherein the marginal portions of the cloth, which extend outside of the portion 10 of the frame, will be positioned upwardly and partially around the wire forming the said frame portion and clamped, by spring pressure in said portion, against the inner surfaces of the walls 8 and against the bottom 16 of the upper bowl; thereby providing continuous engagement between the cloth and the walls of said well and eliminating the possibility of the brew leading around the edges of the filtering device.

By overlapping the portion of the frame, as at 11, the same may be forced into the recess 7 simply by turning the portion 9—a of the handle in a clockwise direction while forcing it downwardly against the mouth of the well. This permits the portion 10 to contract, as it passes the constricted portion of the well at its mouth, and then expand and force the upstanding marginal portions of the filtering cloth 14 against the walls of the well as shown in Fig. 1.

The handle 9 and the projection 12 are formed to provide portions 17 and 18 thereof, which extend parallel to the plane of the coil 10, in order to prevent the overlapping portion 11 from becoming displaced from its superimposed position with relation to the underlying portion of the said coil, while the same is being forced into or pulled out of the well 7.

From the above description it will be understood that with our improved filter device it is possible to use any ordinary piece of cloth material; therefore providing great convenience by eliminating the necessity of having specially constructed filter cloths which may not be available at times.

It will also be seen that the operation of attaching a cloth to the frame 10, by simply forcing the point 13 through the cloth, as at 15, and thereby automatically arching the cloth to support it away from the bottom 16, may be easily understood by persons using our improved filtering device, so that the possibility of mounting the cloth on the frame incorrectly is thereby eliminated.

In the modified form of our invention, as illustrated in Fig. 6 of the drawing, the filtering frame is of practically the same construction as in Figs. 4 and 5 with the exception that the projection 12—a is bent upwardly and provided, at its end, with a hook 20 which is axially disposed in the frame and has a point 21.

In this form of frame, the filter cloth 14—a is attached to the frame by inserting the point 21 through the central portion of the cloth so as to support the same from the center as clearly illustrated in the drawing.

It will further be seen that we have provided an improved frame for a filtering device having novel means whereby a filter cloth may be readily attached thereto for lowering the said cloth downwardly into the well 7 at the bottom of the coffee maker bowl.

We claim:

1. For a coffee maker of the vacuum type comprising an upper bowl, a filtering device including a wire frame having an upwardly projecting handle, a portion adapted to position a filtering member within said bowl, and a projection in said frame extending through said member and supporting the same above an outlet in the bottom of said bowl.

2. For a coffee maker of the vacuum type including an upper bowl having a depression in the bottom thereof and a hollow stem depending from said depression; a filter comprising a wire frame adapted to clamp a filtering member against the walls of said depression, a projection on said frame insertible through said filtering member to underlie the same and thereby support said filtering member above the opening in said stem and spaced from the bottom of said depression.

3. For a coffee maker of the character described, a filter comprising a frame constructed of a single piece of wire and having an annular portion, a handle portion extending vertically therefrom, and a filter member supporting portion formed from an end of said wire and extending crosswise to said annular portion and adapted to be inserted through said filter member and underlie the same.

4. For a coffee maker bowl including a recess in the bottom thereof, a filtering device of the character described including a wire frame having a portion adapted to engage one side of a filtering member for clamping it against the walls of said recess, and a projection adapted to extend through and engage the opposite side of said filtering member for spacing the same above an opening in the bottom of said recess.

5. A filtering device of the character described adapted to retain a sheet of filtering cloth in position by clamping the same in contact with the walls of a recess, said device comprising a frame formed from a single piece of wire and having a portion for overlying said filtering cloth and forcing the marginal portions thereof against said walls, a portion adapted to extend through and underlie said filtering cloth for supporting the same above the bottom of said recess and an opening therein, and a portion extending upwardly to provide a handle for said frame.

6. For a filtering device of the character described, a frame formed from a piece of wire and comprising an annular portion in the form of a coil for clamping a strainer sheet in position over an opening, a supporting projection within said coil extending upwardly therefrom and having a hook at the end thereof insertible through the said strainer sheet for supporting said sheet above the bottom of said frame, and a handle portion extending vertically from said annular portion.

7. A filtering device of the character described comprising a frame constructed of a single piece of wire having an annular portion adapted to rest upon a surface for clamping a filtering member over an opening therein, a handle portion extending upwardly from said annular portion, a projection within said annular portion, and a hook at the end of said projection; the said hook being axially disposed in said frame and adapted to support the filtering member above the bottom of the frame.

8. A filtering device of the character described including a frame constructed from a single piece of wire and having an annular coiled portion, a handle on said coiled portion, and an end portion extending crosswise to said coiled portion; the said end portion having a point at the end thereof for piercing a filtering member and being adapted to underlie and support the said filtering member at a higher level than the bottom of said coiled portion.

9. In a coffee maker including an upper bowl having a depression in the bottom thereof and an opening in the bottom of said depression, a filter comprising a frame constructed of a single piece of wire and having a vertical handle portion, an annular clamping portion, a supporting projection extending crosswise to said annular portion, and a filtering member positioned under said coiled portion with the marginal portions thereof clamped by said coiled portion against the walls of said depression and a central portion of said filtering member being supported by said supporting projection over the said opening.

10. For a coffee maker of the character described, a filtering device including a wire frame having a coiled portion, a vertically arched projection extending across said coiled portion, and a handle extending upwardly from said coiled portion; the said coiled portion being adapted to retain a filter member in clamped position against the sides of a recess in said coffee maker and the said extension being adapted to support the central portion of said filtering member above an opening in the bottom of said recess.

11. For a device of the character described, a filtering device including a wire frame and a filter cloth; the said frame being constructed of a single piece of wire and formed to provide a ring-shaped portion adapted to rest upon the upper surface of said cloth for clamping it in position; an end of said wire extending across said ring portion and underlying the central portion of said cloth to support it over an opening in said device, and a handle portion extending upwardly from said ring-shaped portion.

12. For a device of the character described, a filtering device including a frame for retaining a filtering member in filtering position; the said frame being constructed of a single piece of wire and formed to provide a ring-shaped portion for clamping the filtering member against the walls of a recess in said device; the said portion having overlapping ends, one of said ends extending upwardly to provide a handle for said frame and the other end extending across said ring-shaped portion and being arched to support the filtering member above an opening in the bottom of said recess.

13. In combination with a filter comprising a wire frame having an annular portion and a projection extending across said annular portion, a filtering cloth underlying said annular portion and having said projection extending through an opening therein and underlying the central portion thereof for supporting the said central portion above an opening for liquid.

14. For a filter assembly comprising a wire frame having a projection extending from said frame, a sheet of pervious material having an aperture for receiving said projection and thereby locating the said sheet centrally on the filter frame and in position wherein a portion of the said sheet will underlie the frame and a portion thereof will overlie the said projection and be supported thereby over an opening for liquid.

FRANK E. WOLCOTT.
LOUIS V. LUCIA.